United States Patent [19]

Bonaccio et al.

[11] Patent Number: 5,706,222

[45] Date of Patent: Jan. 6, 1998

[54] MULTIPLE MODE PEAK DETECTOR

[75] Inventors: Anthony Richard Bonaccio, Shelburne, Vt.; Mark Andrew Bergquist, Rochester, Minn.; Kirk William Lang, Williston; Anthony John Perr, Jericho, both of Vt.

[73] Assignee: International Business Machines Corporation, Armonk, N.Y.

[21] Appl. No.: 641,059

[22] Filed: Apr. 29, 1996

[51] Int. Cl.[6] .............................. G11B 5/09; G11B 5/596
[52] U.S. Cl. .............................. 364/847; 360/46; 360/51; 360/77.08; 360/65; 360/40; 360/53; 360/67; 327/58; 327/50; 324/103 P; 375/317
[58] Field of Search .............................. 360/39, 46, 51, 360/75, 55, 65, 53, 40, 67, 77.01, 77.02, 77.08; 327/1, 50, 58; 324/76.11, 103 R, 103 P; 375/317, 316

[56] References Cited

U.S. PATENT DOCUMENTS

| | | | |
|---|---|---|---|
| 4,477,849 | 10/1984 | Berger | 360/77 |
| 4,682,253 | 7/1987 | Leslie | 360/77.07 |
| 4,823,212 | 4/1989 | Knowles et al. | 360/77.08 |
| 4,987,539 | 1/1991 | Moore et al. | 364/413.08 |
| 5,184,343 | 2/1993 | Johann et al. | 369/116 |
| 5,199,576 | 4/1993 | Corio et al. | 209/564 |
| 5,214,319 | 5/1993 | Abdi | 327/58 |
| 5,548,452 | 8/1996 | Bonaccio | 360/46 |
| 5,550,058 | 8/1996 | Corio et al. | 436/63 |
| 5,576,906 | 11/1996 | Fisher et al. | 360/77.08 |
| 5,602,689 | 2/1997 | Kadlec et al. | 360/78.04 |
| 5,608,583 | 3/1997 | Shrinkle | 360/46 |

Primary Examiner—James P. Trammell
Assistant Examiner—Cuong Nguyen
Attorney, Agent, or Firm—Eugene I. Shkurko

[57] ABSTRACT

A peak detector having several novel detection modes including detecting a pair of peaks with opposite polarity and selecting whether or not the peaks must cross programmed thresholds to be detected. The novel detection modes together with several known detection modes are provided in one unit and can be selected by the user. A power down feature is also provided.

14 Claims, 10 Drawing Sheets

FIG. 7

MULTIPLE MODE PEAK DETECTOR

BACKGROUND OF THE INVENTION

1. Technical Field of the Invention

This invention pertains to a peak detector apparatus usable, for example, in disk drives for computer systems or other data handling or storage systems. In particular, this invention pertains to a peak detector including novel detection modes as well as selectability to operate in any one of several detection modes, thereby providing multiple selectable output modes in one unit.

2. Background Art

Over the past few years, most magnetic hard disk drives have begun to use a new method called Partial-Response/ Maximum Likelihood (PRML) to detect and recover data from the analog waveform produced by the read head. This method superseded the previous technique, peak detection, which had been in use since the advent of the disk drive. The move to PRML permits much more data to be packed into a given physical space on the disk surface, which ultimately results in smaller, cheaper disk drives and more efficient processing for computer systems.

Many drive architectures, however, still use peak detection to recover data from the servo area of a disk sector, which is a short burst of information recorded at low density and contains the identification numbers of the track, head, sector, and so on.

Since the method by which the servo information is recorded and recovered influences important drive parameters such as format efficiency (the number of bytes available for user data over the total number of bytes available on the disk) and the electro-mechanical system used to position the heads over the desired track, each drive manufacturer has a different set of requirements for the peak detection algorithm used to recover the data. While it would be possible to design a custom peak detector for a given set of requirements, doing so is impractical in an industry whose produce lifecycles are less than a year long. Hence, a generic peak detector macro with a number of detection modes specifically targeted for servo data recovery is desirable.

It is an object of the invention to provide a peak detector with multiple user selected operation/detection modes.

It is another object of the invention to provide a peak detector with several useful and novel detection modes.

It is yet another object of the invention to provides a peak detector with optional power down modes to reduce power consumption.

SUMMARY OF THE INVENTION

This disclosure describes a peak detector with a large number of detection modes, selectable by the user, specifically for servo data fields. The peak detector apparatus contains inputs for receiving an input signal waveform. Peak characteristics of the waveform are interpreted via an analog section. Four outputs provide characteristic data corresponding to the waveform (logic signals) to a logic section which outputs a pulse upon detecting particular pattern characteristics appearing in the waveform. The detectable characteristics are user selectable and include known waveform patterns as well as a novel dibit detection mode which detects a pair of waveform peaks having opposite polarity. The detector can sense a negative-to-positive dibit and a positive-to-negative dibit. Positive and negative thresholds are separately programmable and may be selected by the user as a required detection parameter. A low power mode is also provided which selectively shuts down the logic section or both the logic and analog sections to conserve power. This inventive peak detector is particularly suitable for disk drive systems used in large or small computer systems or data handling systems.

Other features and advantages of this invention will become apparent from the following detailed description of the presently preferred embodiment of the invention, taken in conjunction with the accompanying drawings.

BEST MODE FOR CARRYING OUT THE INVENTION

[Note on terminology: "Peaks" refers to the positive or negative peaks (i.e., local maxima and minima) of the input signal waveform. A "positive peak" is a peak whose maximum voltage is above zero volts. A "negative peak" is a peak whose minimum voltage is below zero volts. A "valid" peak is a positive peak which crosses the programmed positive threshold or a negative peak which crosses the programmed negative threshold. A "detected" peak or dibit results in an output pulse from the peak detector. For some dibit modes (hysteresis modes) a "detected" dibit requires two "valid" peaks. "Immediately successive" peaks is a pair of peaks (not necessarily valid peaks), one immediately following the other and of opposite polarity. The first peak in a pair of immediately successive peaks "immediately precedes" the second peak in the pair. The first positive/negative peak of a dibit pair does not necessarily immediately precede the second negative/positive peak of the dibit pair.]

Figure 1A:
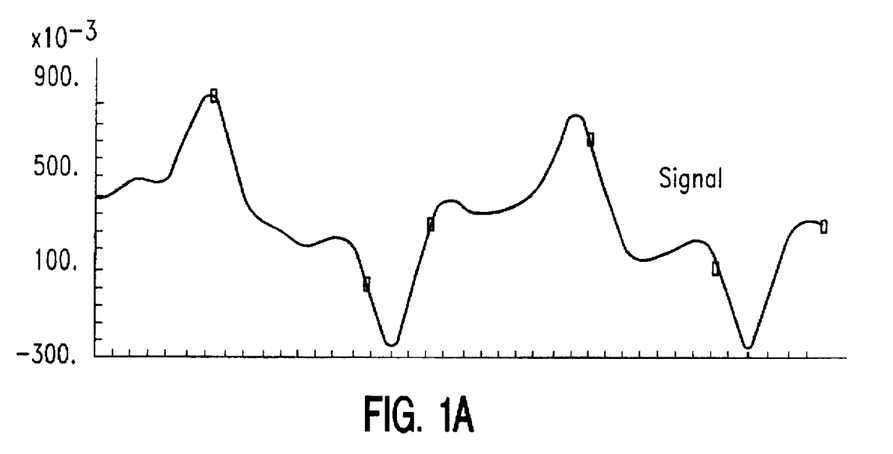
FIG. 1A illustrates a typical waveform of a peak detector input signal.
Figure 1B:
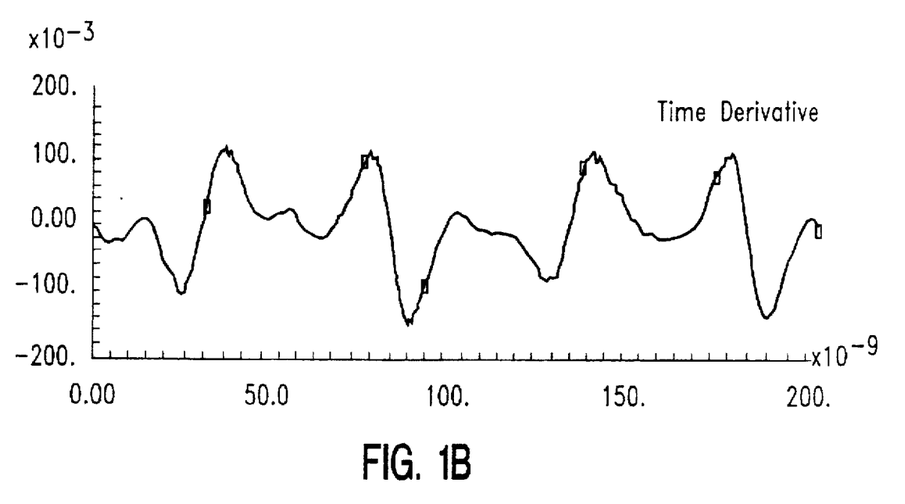
FIG. 1B illustrates a derivative of the waveform of FIG. 1A.

In order to understand the various modes of the peak detector described below, it may be helpful to know what a typical analog input signal waveform from the disk read head looks like. Such a waveform is shown in FIG. 1A as it typically appears at the peak detector input. By this time the input signal has been amplified by a factor of 100 to 200 and its high frequency components removed by an active filter with sharp high frequency rolloff characteristics. This active filter can also be used to generate the derivative of the input signal, which is shown in FIG. 1B. This derivative is useful in peak detection because it crosses zero at the same time a peak in the input signal occurs.

3

DETECTION MODES

The peak detector described herein has six operation/detection modes which are selected by the following three mode control inputs:

Hysteresis Mode (411 of FIG. 4), controls whether or not the polarity of successive peaks must alternate in order to be detected.

Dibit Mode (410 of FIG. 4), controls whether or not an output pulse is caused by individual peaks or pairs of peaks (the second peak in a dibit pair triggers the output pulse).

Dibit Polarity (407 of FIG. 4), determines which polarity the second peak in a dibit pair will be to cause an output when in dibit mode, i.e., whether a detected dibit pair is a positive-to-negative pair (+/−) or negative-to-positive pair (+/−).

Further, since power dissipation of the PRML read channel chip on which this peak detector will be implemented is of great concern, an additional two power control inputs are included:

Kill Detection (408 of FIG. 4) which prevents the logic section from switching (hence reducing power and noise generation) but leaves the detector in a state from which it can recover almost immediately (less than 10 ns).

Power Down (409 of FIG. 4 and 311 of FIG. 3) in which all logic section switching is inhibited and all analog section currents are shut off. It may take up to 1000 ns to recover from this state. This control signal is also transferred to input 311 of FIG. 3.

The mode control inputs can be used together to achieve the following combinations:

In Pulse Detection without Hysteresis mode, a valid peak is detected (i.e. causes an output pulse), regardless of the polarity of the preceding valid peak.

In Pulse Detection with Hysteresis mode, a peak is detected only if it was preceded by a valid peak of the opposite polarity.

In −Dibit Detection without Hysteresis mode, a dibit is detected on the valid negative second peak of a dibit pair regardless of whether the preceding positive peak was valid.

In −Dibit Detection with Hysteresis mode, a dibit is detected on the valid negative second peak of a dibit pair only if the preceding peak was a valid positive peak.

In +Dibit Detection without Hysteresis mode, a dibit is detected on the valid positive second peak of a dibit pair regardless of whether the preceding negative peak was valid.

In +Dibit Detection with Hysteresis mode, a dibit is detected on the valid positive second peak of a dibit pair only if the preceding peak was a valid negative peak.

Outputs

Figures 2A, 2B:
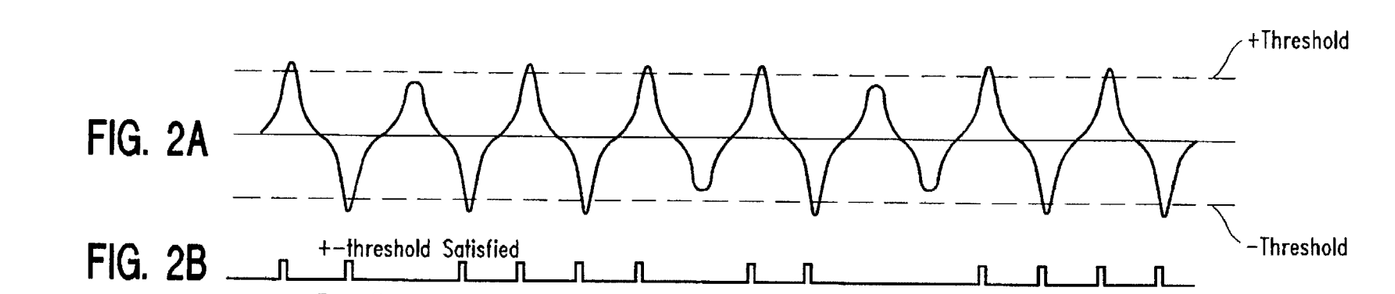
FIGS. 2A illustrates an example input signal waveform with programmed positive and negative threshold levels indicated.
FIGS. 2B–D are examples of outputs from a peak detector's analog section responsive to the example input waveform of FIG. 2A (not aligned with the example waveform).
Figure 2C:
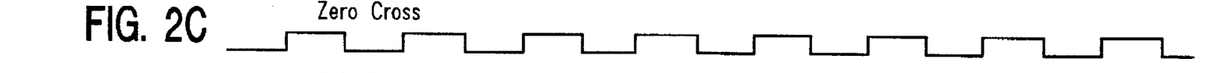
Figure 2D:
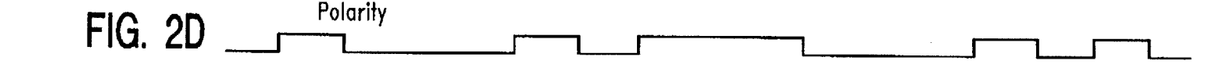
Figure 2E:
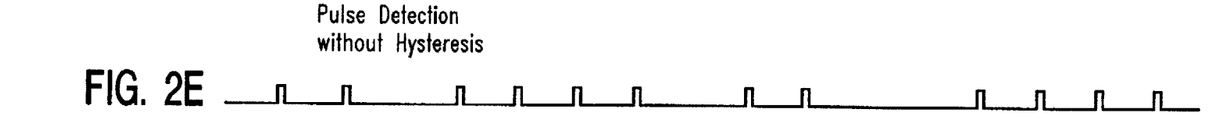
FIGS. 2E–H are example detection outputs of the peak detector responsive to the example input waveform of FIG. 2A (aligned with the example waveform).
Figure 2F:
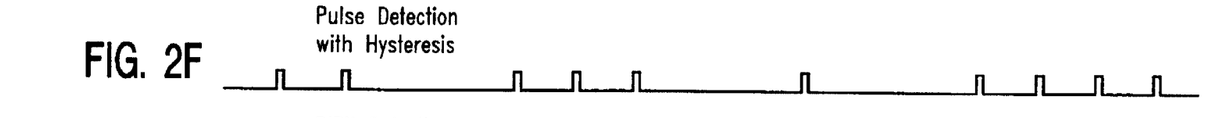
Figure 2G:
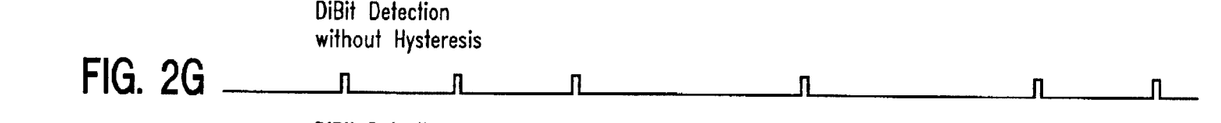
Figure 2H:
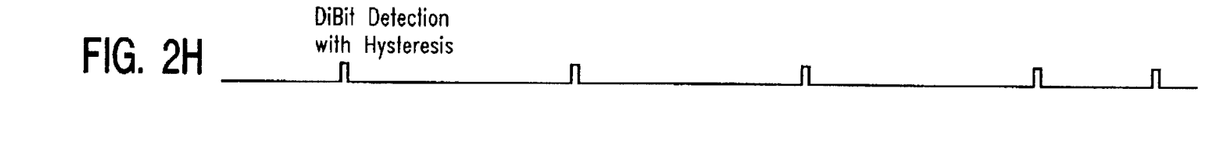

The main output of the peak detector is a 10 ns pulse that occurs whenever a valid peak is detected, examples of which are illustrated in FIGS. 2E–H. A secondary output (406 of FIG. 4) indicates the polarity of the most recently detected valid peak (waveform illustrated in FIG. 2D).

Circuit Configuration

The circuit of the peak detector is comprised of two main portions. An analog section (illustrated in FIG. 3), which monitors the input signal and its derivative, generates the following four logical output signals:

4

C_POL 301 (Clock Polarity): A signal that is high when the input signal's derivative amplitude is greater than 0.

P_COMP 302 (Positive Compare): A signal that is high when the differential signal input voltage is greater than the programmed positive threshold. Corresponds to output shown in FIG. 2B.

N_COMP 303 (Negative Compare): A signal that is high when the differential signal input voltage is less than the programmed negative threshold. Corresponds to ORing A_POL and P_COMP.

$A_{13}$ POL 304 (Amplitude Polarity): A signal that is high when the input signal amplitude (differentially) is greater than 0. Corresponds to output shown in FIG. 2C.

A digital section (illustrated in FIG. 4), which looks at the control bits 407–411, used to select a detection mode, and the output of the analog section 401–404 generates the outputs 405, 406 for the detection modes described above.

ANALOG SECTION

Figures 3, 3A:
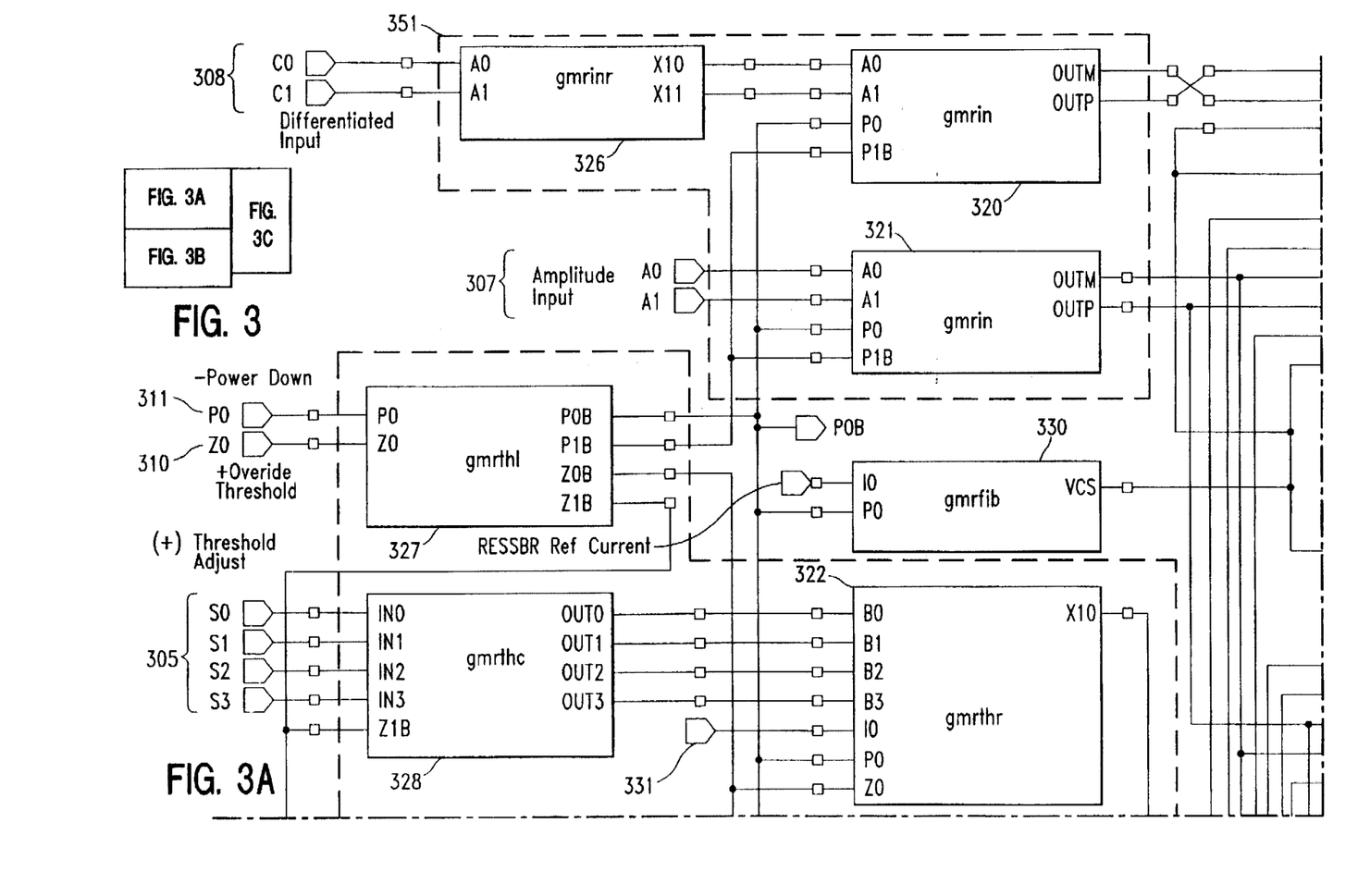
FIG. 3 illustrates the peak detector analog section.
Figure 3B:
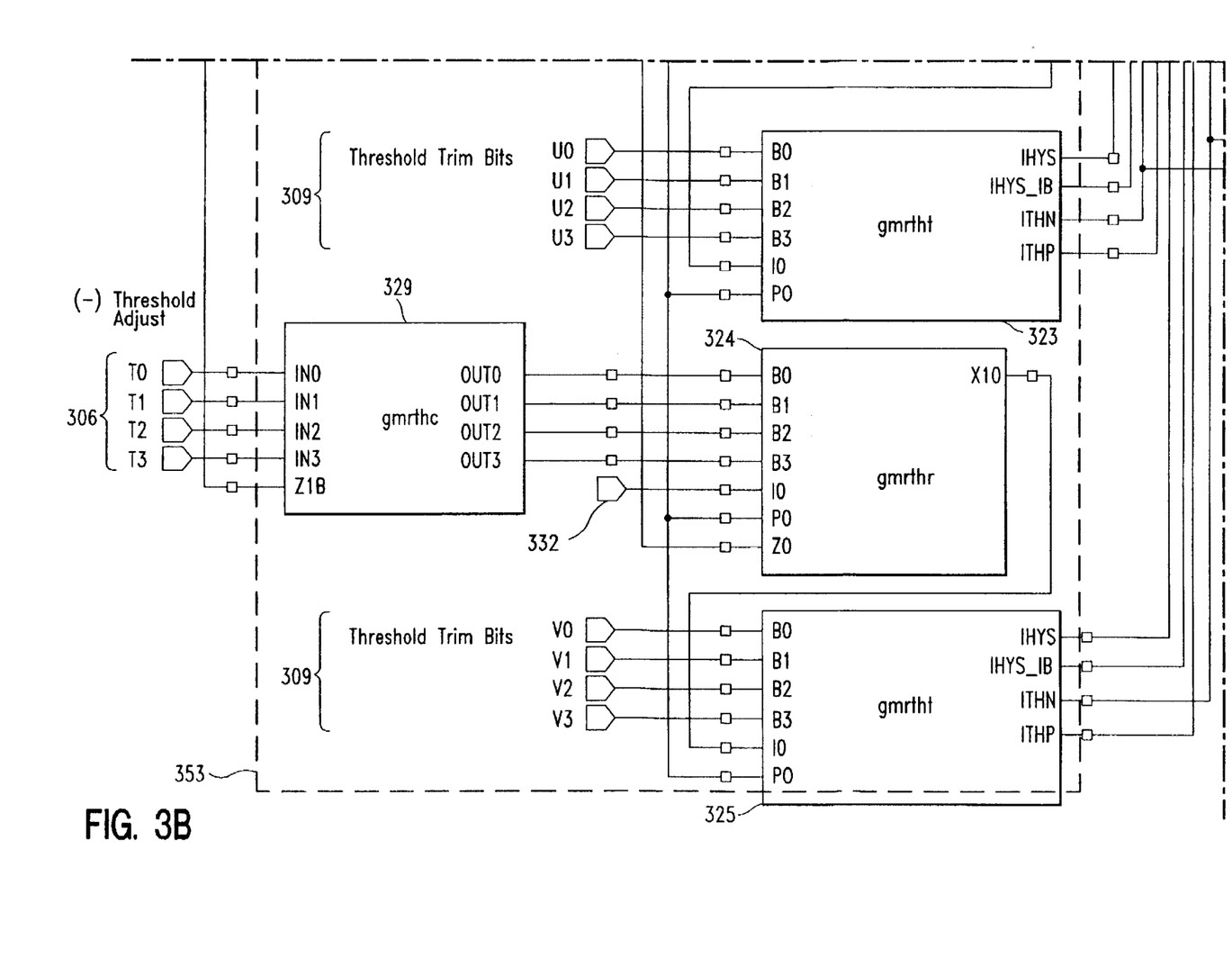
Figure 3C:
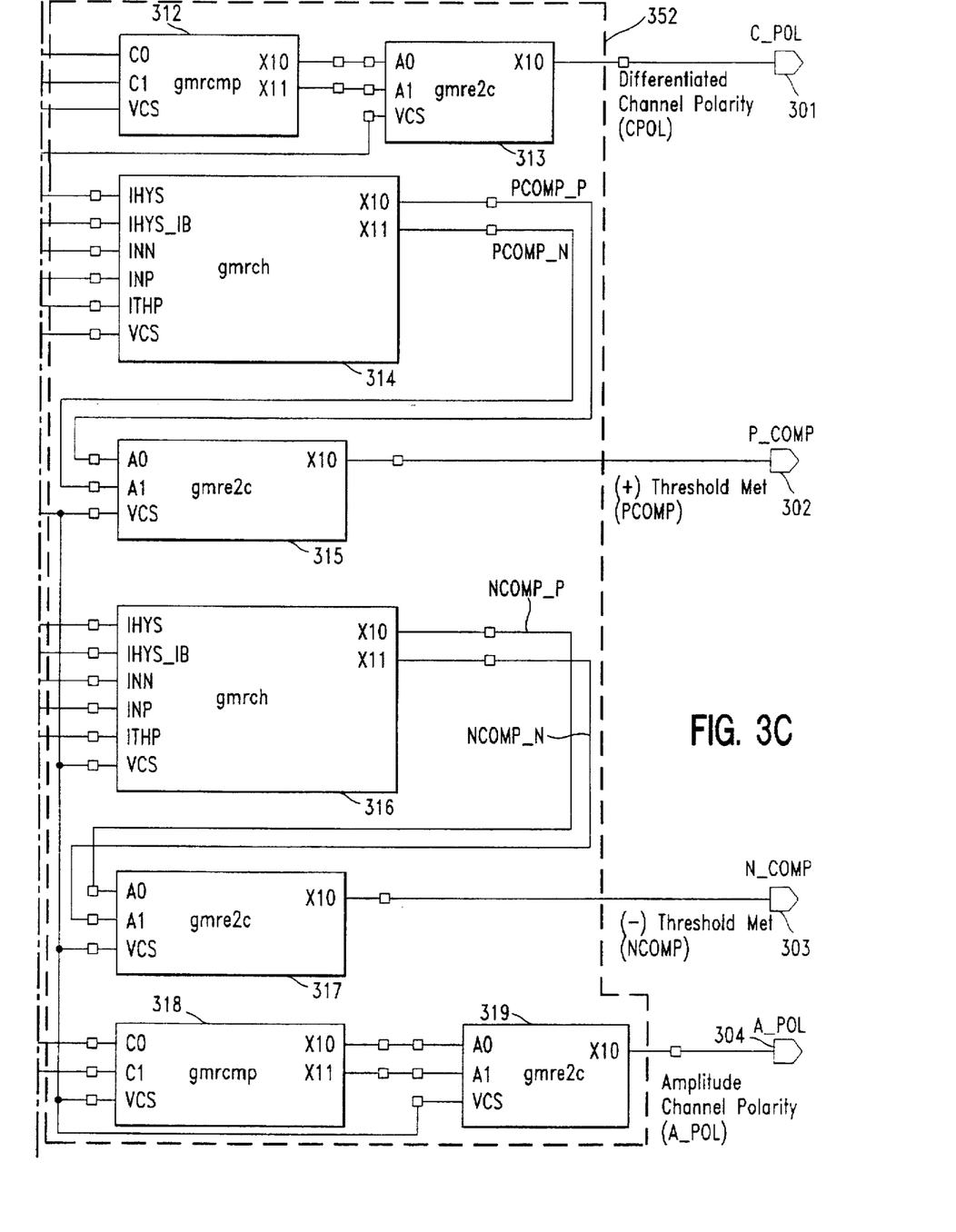

The block diagram of the analog section shown in FIG. 3 includes several devices known in the prior art. The novel programmable threshold differential comparators 314, 316 are described in Part II of the present specification. Another novel circuit used in this block diagram is the input source follower buffers 320, 321 which are described in commonly owned U.S. application Ser. No. 08/639,868 entitled "Differential Source Follower with Body Effect Compensation", filed Apr. 26, 1996. The above identified patent application is incorporated herein by reference. Other source followers are also known in the prior art, but do not provide as accurate an output.

The function of the analog section is straightforward. The comparators 312, 314, 316, 318, generate the outputs for the detection modes described above. The remaining blocks are primarily used to set the thresholds of the programmable comparators. These thresholds are set by the user using the eight (four (+) 305 and four (−) 306) threshold control bits. The thresholds are set by modifying the amount of current input to the comparators (received at inputs 331 and 332). This current tracks the average amplitude of the signal, which is set by an automatic gain control loop (prior to the analog section).

The analog section of the peak detector has two input signals: the read signal from the head 307 and its derivative 308 which are both differential inputs. Prior to being sent to the analog section, the amplitude of the head signal is adjusted by an automatic gain control (AGC) loop and its spectrum band-limited by a continuous-time filter, which is also used to generate the derivative signal. These two signals are AC-coupled into the peak detector. The analog section also receives a reference signal (+/− threshold) which tracks the reference to which the AGC loop locks. This reference is used to allow the thresholds for the peak detection comparators to be set with respect to the nominal AGC-controlled amplitude, rather than an absolute number. Finally, the analog section receives a number of logical control signals 309–311; these are used to program and trim the thresholds 309, override the programmed threshold 310, and power-down 311 the analog section when it is not in use (also selectable from the logic section power inputs).

Figure 5:
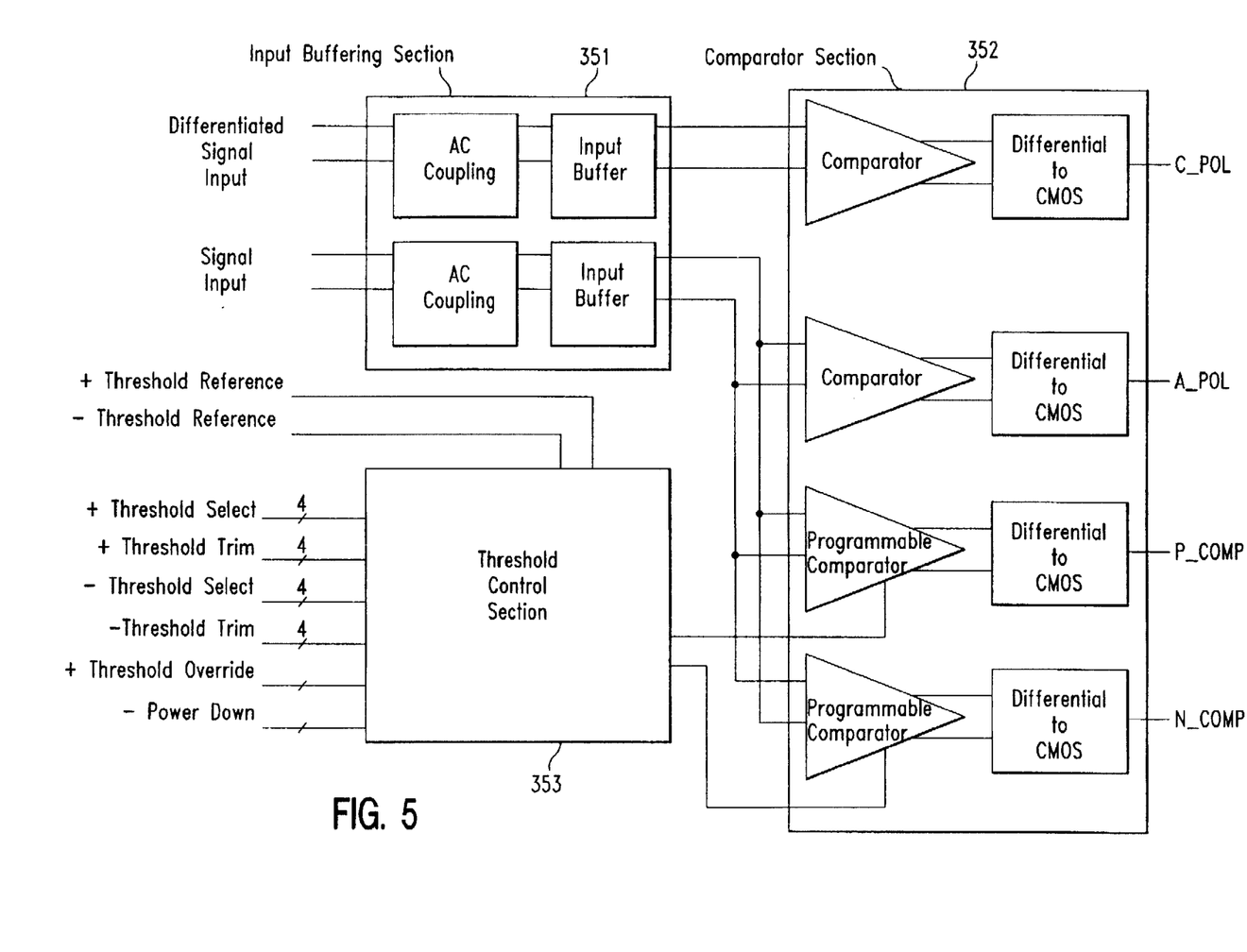
FIG. 5 illustrates a general block diagram of the analog section shown in FIG. 3.

The analog portion of the peak detector comprises three general sections: an input buffering section 351, a threshold control section 353, and a comparator section 352. This is illustrated in FIG. 5 which is a simplified block diagram of FIG. 3. The input buffers serve to AC-couple the signal into the peak detector and prevent the comparators from excessively loading the driving circuitry. The pole of the AC coupling network must be set low enough to allow signals in the frequency range of interest to pass unattenuated, but also should be high enough to allow quick recovery from DC offsets and transient events such as thermal asperities. In general, this means setting the pole somewhere between a few hundred kHz and a few MHz. The input buffers are unity-gain differential source followers.

The user can select a threshold from 10 to 80 percent of the average signal amplitude. The positive and negative thresholds are separately programmable. In addition, it is possible to select a threshold of approximately 130% of the signal to prevent any detection from occurring while keeping the analog section in normal operating mode. The threshold control section takes the threshold current reference—which in this case is actually two references, one for the positive threshold 331 and one for the negative threshold 332—and modifies it in accordance with the threshold control bits 305, 308. In this case, there are four threshold control bits IN0–IN3 for each threshold 305, 306 and a code of 0 (0000) represents a threshold equal to 10% of the nominal AGC amplitude and a code of 15 (1111) represents a threshold of 80% of the nominal AGC amplitude with linearly interpolated steps in between. The threshold control references are currents, and the threshold control circuits (322 and 323 for (+), 324 and 325 for (−)) are simply conventional weighted-area FET DACs which scale the reference current from 10% to 80% of its value depending on the threshold control bit settings. Since there are a number of relatively inaccurate FET current mirrors in this path, a means of trimming 309 the threshold is also provided. This is yet another current DAC, which takes the scaled reference current from the threshold control circuit and modifies it from approximately 85% to 115% of its value. This setting is controlled by four threshold trim bits B0–B3, whose optimum value is determined and permanently set (using fuses) at the time of the chip's manufacture. A single input logic control bit 310 is used to override the programmed setting of the threshold and internally forces all the threshold control bits to a 1. Further, the output of the threshold control DAC is set to approximately 130% of the nominal AGC amplitude (when override is selected). By this means, a stand-by state is created in which the logic section is effectively prevented from switching (to reduce noise) but remains powered on and can be re-activated quickly (<10 ns). A second single control bit 311 is used to turn off all bias currents in all of the analog circuits, which puts the peak detector analog in a state in which it dissipates zero power but requires a long time (hundreds of ns) to recover.

The comparator section 352 uses two different types of comparators. Standard differential comparators 312, 318 are used to determine whether or not the head signal 307 and its derivative 308 are greater than or less than zero. Differential comparators 314, 316 with programmable (non-zero) thresholds are used to determine when the head signal 307 exceeds the programmed positive or negative thresholds.

Each comparator generates a logical signal at small-swing, differential output levels referenced to the positive supply. Hence, each comparator drives a differential-to CMOS converter circuit 313, 315, 317, 319 which generates a signal useful to the logic section. The comparator outputs are P_COMP 302, which is high whenever the head signal is more positive than the programmed positive threshold; N_COMP 303, which is high whenever the head signal is more negative than the programmed negative threshold; A_POL 304, which is high whenever the head signal is greater than zero volts; and C_POL 301, which is high whenever the head signal derivative is greater than zero volts. This last signal has the important characteristic of indicating a peak in the head signal 307 whenever it crosses through zero; a crossing from negative to positive (positive transition on C_POL) indicates the occurrence of a negative peak in the head signal, and a crossing from positive to negative (negative transition on C_POL) indicates the occurrence of a positive peak in the head signal. When a positive signal on either P_COMP 302 or N_COMP 303 is followed by a transition in C_POL 301, a "qualified" peak is said to have occurred (i.e. a verified datum) and it is assumed that a magnetic transition on the disk has been detected. All four outputs are passed to the logic section for further algorithmic processing prior to issuing an output pulse.

In reference to FIG. 3, the following points will provide additional details:

Blocks "gmrinr" 326 and "gmrin" 320 comprise the input buffer section as described above. They are the AC coupling and input buffer circuits, respectively. In the preferred implementation (FIG. 3), the AC-coupled read signal is shared with another circuit and the AC coupling is done in that circuit. Hence, there is only one AC-coupling circuit that actually resides in the peak detector, even though the general block diagram of FIG. 5 shows a separate AC coupling sections for each input.

Blocks "gmrcmp" 312, 318, "gmrch" 314, 316, and "gmre2c" 313, 315, 317, 319, comprise the comparator section. They are the comparators, programmable-threshold comparators, and differential-to-CMOS converter circuits, respectively.

Blocks "gmrthl" 327, "gmrthc" 328, 329, "gmrthr" 322, 324, and "gmrtht" 323, 325 comprise the threshold control section: "gmrthl" is simply a double-inverter buffer that generates both true and complement for the power-down and threshold override signals; "gmrthc" is a logic circuit that sets all of the internal threshold control bits to 1 if the threshold override is asserted; "gmrthr" is the threshold control DAC circuit; and "gmrtht" is the threshold trim DAC circuit.

Block "gmrfib" 330 is not discussed herein. It is a standard reference current generator, known to those skilled in the art, that creates a bias reference for the comparators. It is not relevant to the novelty of the invention but is required by the presently preferred embodiment. Some blocks have an input labeled "VCS". These are the bias reference inputs mentioned in the previous paragraph.

There are four lines shown running between each threshold control/threshold trim block pair and their associated programmable threshold comparators 314, 316. These are required to set the programmable threshold, and are described in more detail in Part II below. Current inputs 331 and 332 are the supplied (+) and (−) threshold reference currents, respectively.

LOGIC SECTION

Figures 4, 4C:
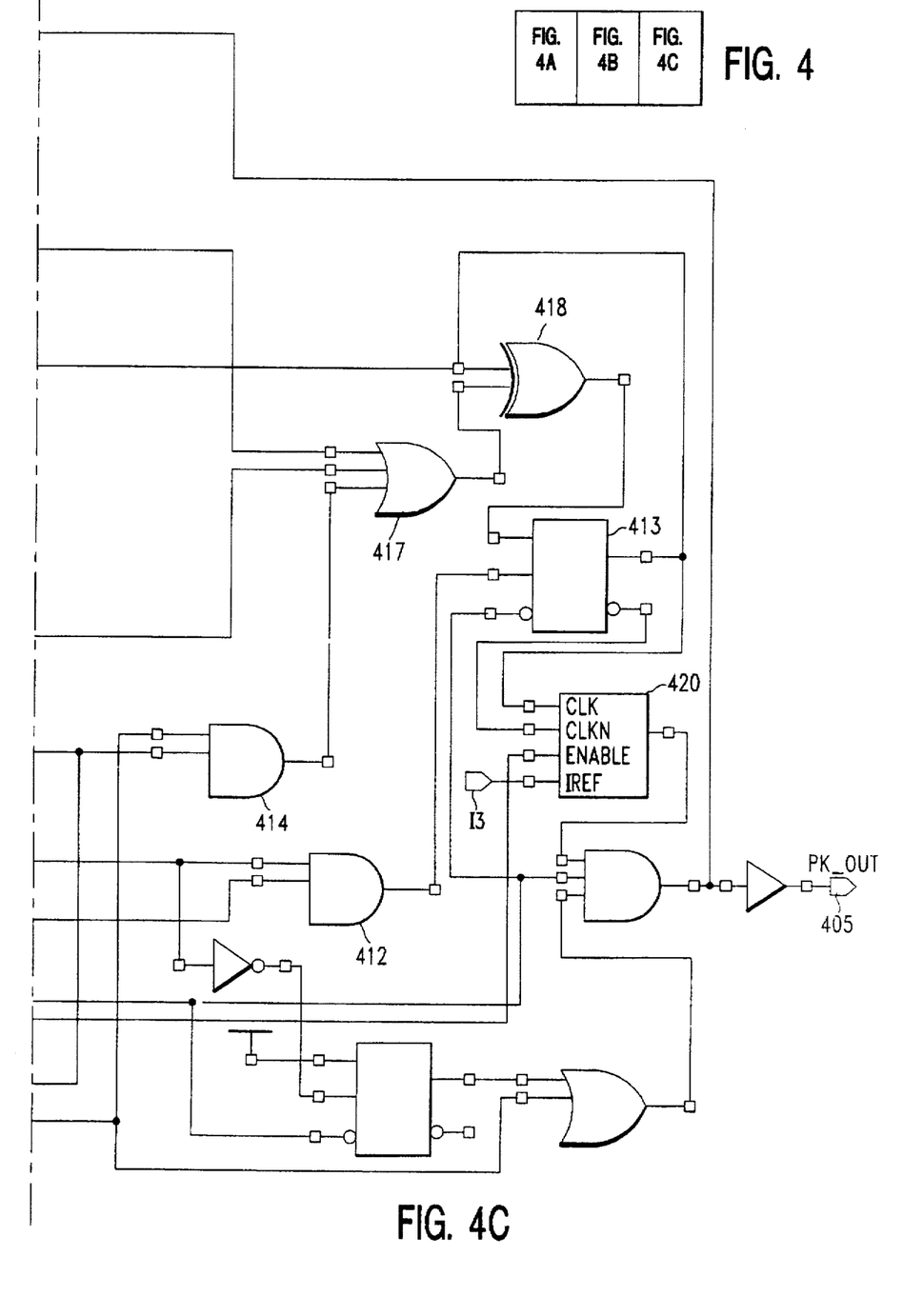
FIG. 4 illustrates the peak detector logic section.
Figure 4A:
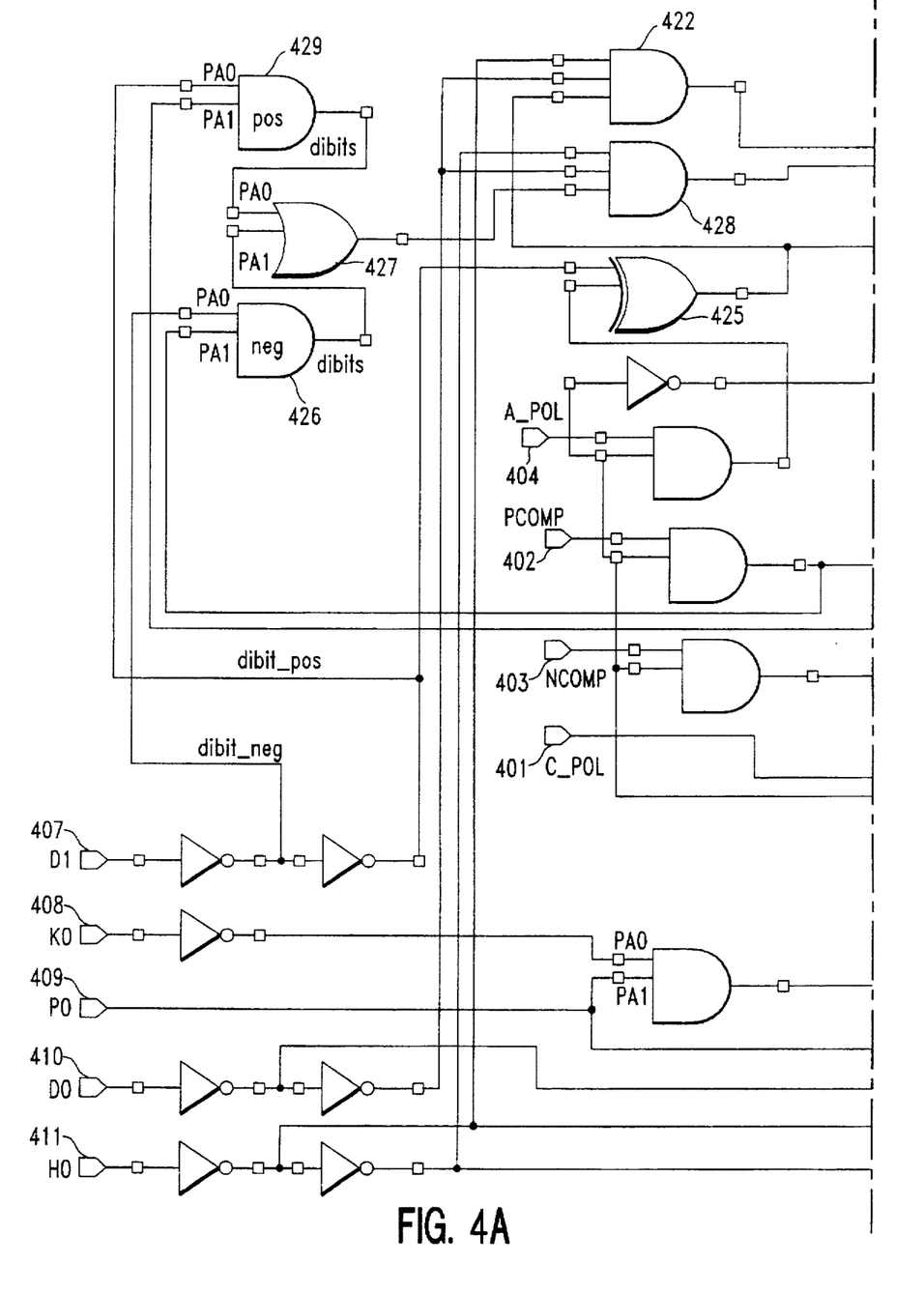
Figure 4B:
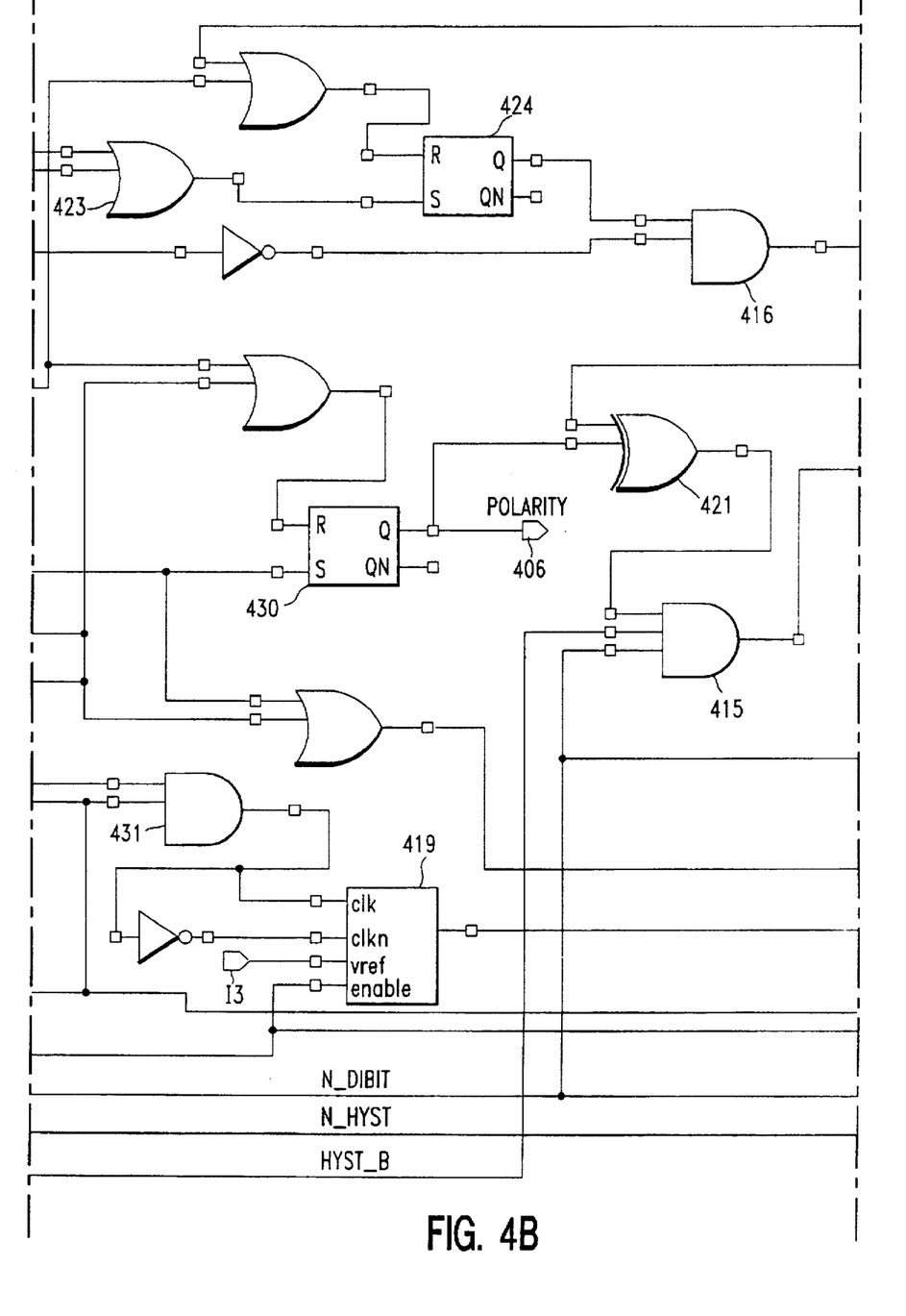

Referring to FIG. 4, the logic section uses its input control bits 407–411 to determine how the outputs of the analog section (received at 401–404) are interpreted. It's easier to consider the operation of the logic starting with its output(s). The logic creates an output pulse 405 from a single-shot circuit 420 that fires whenever it sees an edge (rising or falling) at its input. [A novel circuit used in this block diagram are the single-shot circuits 419, 420 which are described in commonly owned U.S. application Ser. No. 08/641,062 entitled "Simplified Differential Single-Shot", filed Apr. 29, 1996. The above identified patent application is incorporated herein by reference.] These input edges are created by a D-type flip-flop 413, whose data and clock inputs are set by the remaining logic depending on what mode the circuit is in. In essence, what the logic does is change the state of the data input to the DFF 413 if it determines that the input signal has crossed the programmed threshold and the rules for qualification (dibit, hysteresis, etc. in effect at the time) have been met. Subsequent to that, the logic generates a clock to the DFF 413 if it sees a valid state change in the output of the differentiated channel, which indicates that a peak in the input signal has occurred. In qualifying the input signal, one thing the logic does is set an SR-type flip-flop 430 when the input amplitude exceeds the positive threshold and resets the SR 430 when the input amplitude falls below the negative threshold. The output of the SR 430 is used in further qualifying the peak, but is also provided as a primary output 406 (POLARITY) which is useful at the drive level.

LOGIC THEORY OF OPERATION

Clock Qualification and Generation

The clock qualification and generation portion (C_POL input, 431, 419) is somewhat similar to existing art. This portion of the logic operates in all detection modes. The comparator levels are set to ensure the P_COMP and N_COMP are at least 20 ns apart. The C_POL changes state at every peak. This clocks the one-shot 419 which produces a 10 ns pulse. If either P_COMP or N_COMP is valid, the peak is valid and 412 generates the qualified clock signal.

The D latch 413 and output one-shot 420 work together. When the input to the D latch 413 changes state, the one-shot 420 is clocked and generates a consistent PK_OUT 405 to, for example, servo controller logic or an outside servo controller.

Normal Mode

In Normal Mode, all peaks are desirable and an output is expected on each one. For this mode, 414 is active and both 415 and 416 are inactive. Thus, 417 is active which causes 418 to invert the data to the D latch 413 on each successive peak. This provides a trigger to the one-shot 420 and a corresponding output for each peak.

Hysteresis Mode

In Hysteresis Mode, only peaks immediately following a valid peak of the opposite polarity are desirable. For this mode, 415 is active. The SRFF 430 is used to keep track of the polarity of a peak. It is compared to the polarity of the previous peak with XOR 421. When they differ, 417 and 418 switch states of the D latch 413 and produce an output pulse.

Negative Dibit Mode

In this mode, only negative peaks which follow a positive peak are desirable . The positive peak need not be a valid peak, i.e. it does not have to pass the comparator threshold. The combination of 422, 423 and SRFF 424 search for a positive peak. When one is found, the SRFF 424 is set. Since it was caused by a positive peak, 416 is inactive. On the next negative peak which causes a qualified clock pulse, 416 will be set and, along with 417 and 418, cause the D latch 413 to switch states and create the output. This output clears the SRFF 424 which is ready to look for the next positive peak.

Positive Dibit Mode

In this mode, only positive peaks which immediately follow a negative peak are desirable. The negative peak need not be a valid peak. This mode works the same as the negative mode above, and uses the same circuitry. The XOR 425 inverts both the search value (direction of zero cross on preceding peak) and the signal feeding AND gate 416. Thus, positive peaks are detected.

Negative Dibit Mode with Hysteresis

In this mode, only valid negative peaks which immediately follow a valid positive peak are desirable. 426, 427, 428, 423, and SRFF 424 search for a positive peak. The remainder of the circuit works as above, using the next qualified clock caused by a negative peak to trigger the output.

Positive Dibit Mode with Hysteresis

In this mode, only valid positive peaks which follow a valid negative peak are desirable. 429, 427, 428, 423, and SRFF 424 search for a negative peak. The remainder of the circuit works as above, using the next qualified clock caused by a positive peak to trigger the output.

ADVANTAGES OVER THE PRIOR ART

Many peak detectors have been implemented for disk drives in the past. However, all of these known to the inventors have been for a single purpose with a single, hard-wired detection algorithm. The advantages of the method of the preferred embodiment of this invention include: its multi-mode capability; pulse detection; positive dibit detection; negative dibit detection; each selectable with or without hysteresis (adjacent peaks of opposite polarity).

PART II

Figure 6:
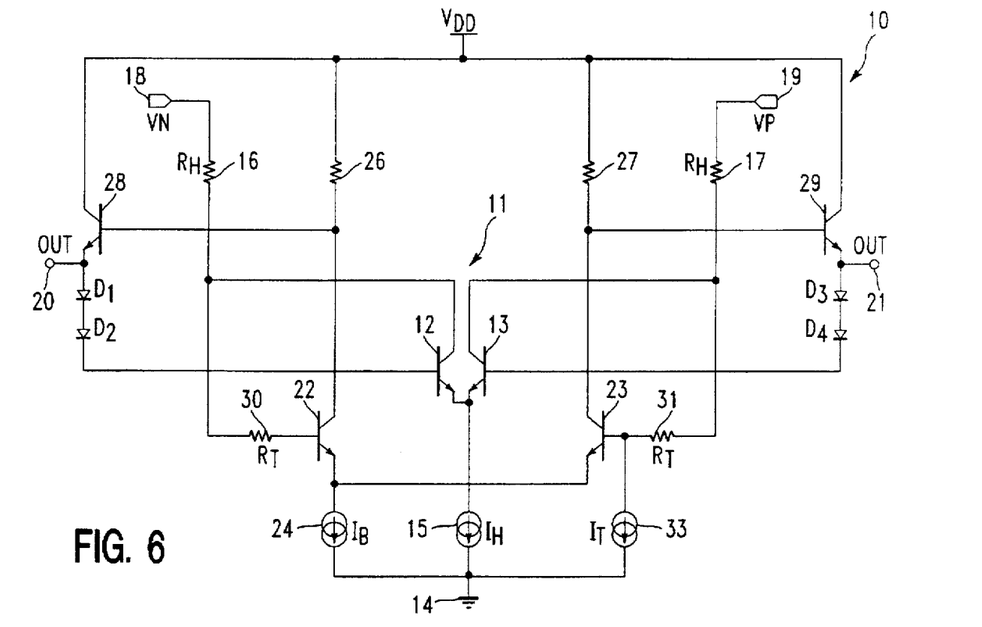
FIG. 6 illustrates a differential comparator usable in the present invention.

Referring to the drawing and especially FIG. 6, there is shown a simple embodiment of the comparator circuit of the present invention in schematic form. This schematic sets forth the comparator circuit 10 of the invention and includes a hysteresis switch 11 comprised of a pair of NPN, bipolar, emitter coupled transistors 12 and 13 whose emitters are coupled to ground 14 through a hysteresis current source 15. The collectors of transistors 12 and 13 are respectively coupled, through respective hysteresis resistors 16 and 17, to respective differential inputs 18 and 19 and their bases are respectively coupled to the outputs 20 and 21 through respective diode pairs D1, D2 and D3, D4.

The circuit 10 further includes a second emitter coupled switch formed of a pair of NPN, bipolar, emitter coupled, main amplifier transistors 22 and 23. The emitters of these main amplifier transistors 22 and 23 are coupled to ground 14 through a bias current source 24. The collectors of these amplifier transistors 22 and 23 are respectively coupled to a supply voltage $V_{DD}$ through respective current resistors 26 and 27 and to the bases of respective output NPN, bipolar, drive transistors 28 and 29. The bases of the main amplifier transistors 22 and 23 are respectively connected through respective threshold resistors 30 and 31 to the collectors of the switching transistors 12 and 13. The base of amplifier transistor 23 is further coupled to ground 14 through a threshold current source 33.

The output drive transistors 28 and 29 have their collectors coupled to the voltage source $V_{DD}$ and have their emitters respectively coupled to the respective outputs 20 and 21 and thence through the respective diode pairs D1, D2 and D3, D4 to the bases of the respective switch transistors 12 and 13.

The described circuit operates as follows. It will be assumed that varying differential input voltage signals are respectively applied to the inputs 18 and 19. For purposes of this description, it will be assumed that initially the voltage of the signal applied to the input 18 is much higher than the voltage of the signal applied to the input 19. The higher voltage applied to input 18 causes the amplifier transistor 22 to turn on to permit current to flow from the voltage source $V_{DD}$ through the current resistor 26, the transistor 22, and the current source 24 to ground 14. When transistor 22 turns on the voltage applied the base of the drive transistor 28 is lowered. Since transistor 28 operates as an emitter follower, the lowering of its base voltage also lowers the voltage at its emitter and at base of transistor 12 and transistor 12 is held off.

Simultaneously, the transistor 23 is held off by the lower input voltage applied to its base from input 19. Because transistor 23 is off the voltage applied to the base of the drive transistor 29 remains high, transistor 13 remains on and current flows from the input 19 through the hysteresis resistor 17, the transistor 13 and the hysteresis current source 15 to ground. It should be noted that the threshold current source 33 continues, under all circuit conditions to draw a constant current from the input 19 through both the hysteresis resistor 17 and the threshold resistor 31.

As the applied input voltage signals change, the difference therebetween decreases and, as the voltage difference between the two inputs approaches the total voltage across threshold resistor 31 and hysteresis resistor 17, both of the main amplifier transistors 22 and 23 begin to conduct and the amplifier enters its linear mode.

With the main amplifier in its linear mode, the hysteresis switch, comprised of transistors 12 and 13, also enters its linear mode because of the feedback loops between the collectors of the hysteresis switch transistors 12 and 13 and the bases of the respective amplifier transistors 22 and 23 to which each of said collectors is respectively coupled. These feedbacks between transistors 12 and 22 and between transistors 13 and 23 are positive and cause the entire network to switch when the feedback loops reach unity gain. This occurs approximately at the point at which the voltages applied to the bases of the transistors 22 and 23 become equal.

When the differential voltages applied to the inputs 18 and 19 continue to change, i.e., input 19 becomes more positive than input 18 plus the total voltage across the threshold resistor 31 and the hysteresis resistor 17, the amplifier transistor 23 turns on more fully and the transistor 22 turns off. Now the current flowing, from $V_{DD}$ through the bias current source 24 to ground 14, switches to flow from $V_{DD}$ through the current resistor 27, the transistor 23, and the source 24 to ground 14. With the turning on of transistor 23 the voltage applied the base of the drive transistor 29 is lowered. Since transistor 29 operates as an emitter follower, the lowering of its base voltage also lowers the voltage at its emitter and at the base of transistor 13 and transistor 13 turns off.

With transistor 22 now off the voltage applied to the base of the drive transistor 29 goes high mining on transistor 12 and current now flows from the input 18 through hysteresis resistor 16, transistor 12 and the hysteresis current source 15 to ground. It should be noted that the threshold current source 33 continues, under all circuit conditions to draw a constant current from the source 19 through both the hysteresis resistor 17 and the threshold resistor 31.

If the input voltage VP, at input 19, now decreases with respect to the input voltage VN, at input 18, the circuit will eventually return to the initial state previously described. However the threshold voltage at which this occurs is different from that at which the circuit switched from the initial state. This is due to the current $I_H$ now flowing through the hysteresis resistor 16 rather than through the hysteresis resistor 17. This causes the base of amplifier transistor 22 to be at a voltage $I_H R_H$ below the input voltage VN, while the base of amplifier transistor 23 is at $I_T(R_H+R_T)$ below the input voltage VP. The switch point from this state also occurs when these base voltages are approximately equal, or where $(VP-VN)=I_T(R_H+R_T)-I_H R_H$ This contrasts with a switch point at $(VP-VN)=I_T(R_H+R_T)+I_H R_H$ from the initial state described above.

Thus there has been taught a comparator circuit in which a decisive comparison of analog differential signals to an arbitrary threshold level can be made. Also the circuit permits the logical indication of whether the differential input is greater than (logical 1 output) or less than (logical 0 output) the threshold.

It can be readily demonstrated that the comparator has switch points at a voltage equal to flow $I_H$ through in the hysteresis current source 15 and the hysteresis resistor ($R_H$) 16 i.e., $I_H R_H$ above and below a threshold $I_T(R_H+R_T)$ results in a hysteresis width of $2I_H R_H$. This means the hysteresis of the comparator can be set independently of the threshold voltage or can be set to track the threshold voltage by simply choosing the appropriate values of $I_T$, $I_H$, $R_T$, and $R_H$.

Analysis of the circuit will readily show that by meeting the following criteria the comparator threshold will be proportional to the externally supplied voltage $V_{TH}$ and the hysteresis will be $\alpha V_{TH}$ where $\alpha$ is desired constant of proportionality between the threshold and the hysteresis.

Figure 7:
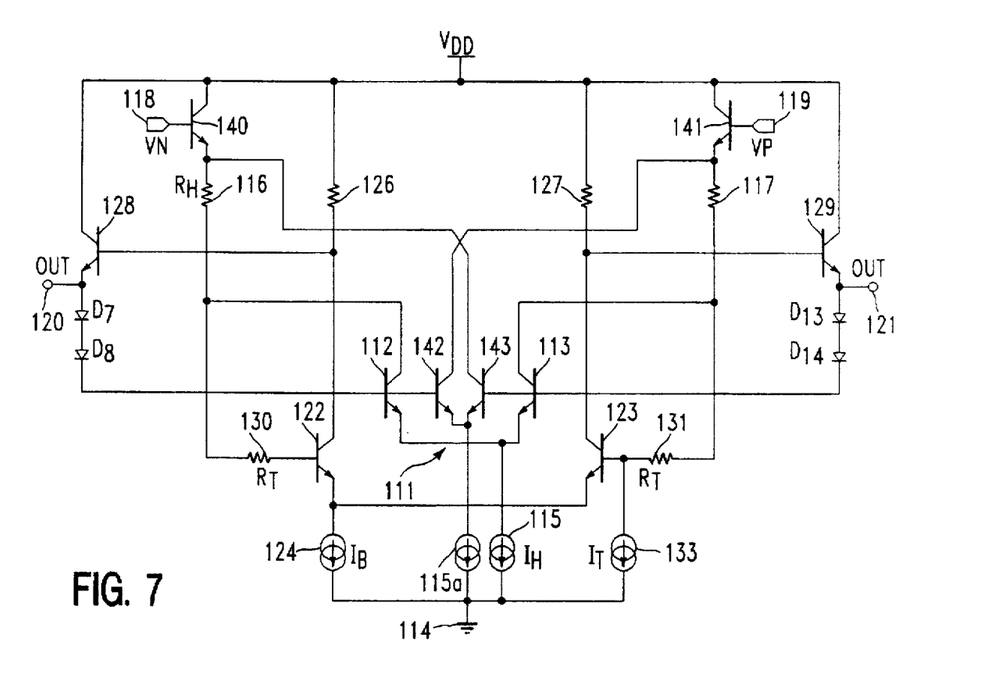
FIG. 7 illustrates a preferred differential comparator used in the present invention.

The preferred embodiment of the comparator is shown in FIG. 7. In this FIG. 7, the comparator circuit of the invention includes a hysteresis current switch comprised of a pair of NPN, bipolar, emitter coupled transistors 112 and 113 whose emitters are coupled to ground 114 through a hysteresis current source 115. The collectors of transistors 112 and 113 are respectively coupled through respective hysteresis resistors 116 and 117 to the emitters of a pair of NPN, bipolar emitter follower transistors 140 and 141. Thus the collector of transistor 112 is connected to the emitter of emitter follower transistor 140 and the collector of auxiliary switch transistor 113 is coupled to the emitter of emitter follower transistor 141. Respective differential inputs 118 and 119 are respectively coupled to the bases of these emitter follower transistors 140 and 141. The bases of the switching transistors 112 and 113 are respectively coupled to the outputs 120 and 121 through respective diode pairs D7, D8, and D13, D14.

An auxiliary emitter coupled current switch is formed of NPN, bipolar transistors 142 and 143, whose bases are coupled in common with the bases of the switching transistors 112 and 113. This auxiliary current switch is also coupled between the emitter follower transistors 140 and 141 and ground 114. More specifically the emitters of the auxiliary transistors 142 and 143 are coupled through a separate current source 115a to ground 114 and their collectors are cross-coupled to the respective emitters of the emitter follower transistors 140 and 141. Thus the collector of transistor 142 is connected to the emitter of emitter follower transistor 141 and the collector of auxiliary switch transistor 143 is coupled to the emitter of emitter follower transistor 140.

In a manner similar that shown in FIG. 6 circuit shown in FIG. 7 further includes a pair of NPN, bipolar, emitter coupled, main amplifier transistors 122 and 123. The emitters of these main amplifier transistors 122 and 123 are coupled to ground 114 through a bias current source 124. The collectors of these amplifier transistors 122 and 123 are respectively coupled to a supply voltage $V_{DD}$ through respective current resistors 126 and 127 and to the bases of respective output drive NPN, bipolar, transistors 128 and 129. The bases of the main amplifier transistors 122 and 123 are respectively connected through respective threshold resistors 130 and 131 to the collectors of the switching transistors 112 and 113. The base of amplifier transistor 123 is further coupled to ground 114 through a threshold current source 133.

The output drive transistors 128 and 129 have their collectors coupled to the voltage source $V_{DD}$ and have their emitters respectively coupled to the respective outputs 120 and 121 and thence through the respective diode pairs D7, D8 and D13, D14 to the bases of the respective switch transistors 112 and 113.

The addition of the emitter follower transistors 140 and 141 and the auxiliary current switch formed of transistors 142 and 143 significantly improve the operation of the comparator circuit of the present invention. By buffering the input voltages $V_P$ and $V_N$ with the emitter follower transistors 140 and 141, the effective load on the circuit driving these points is reduced. Addition of the these devices also results in a level shift of the base to emitter voltage $V_{be}$ and any base to emitter voltage $V_{be}$ mismatch between the two follower transistors 140 and 141 manifests itself as an offset from the threshold voltage. The minimum $V_{be}$ difference will occur if the currents through the two devices are kept equal. The currents through the emitter follower transistors 140 and 141 can be made to be constant under all operating conditions by selectively setting the bias current levels passing through the second and third current switches i.e., the current switches respectively formed of transistors 124 and 133 and transistors 142 and 143.

By cross coupling the collectors of the auxiliary current switch transistors 142 and 143 as above described, the extra hysteresis current $I_H$ through the current source 115a is steered by the emitter follower transistor that is driving the main amplifier transistor that is on. This current is selected to assure that when all bias and base currents flowing in the circuit are accounted for, the total current in follower transistors 140 and 141 will be precisely equal. In the actual circuit built the threshold voltage was 80% of the voltage difference between the external threshold voltage and the reference voltage and the actual width of the hysteresis was nominally 20% of the threshold voltage.

Although the circuits were shown as being implemented using NPN bipolar transistors it should be noted that PNP bipolar transistors can be substituted with the proper voltage changes. Also field effect transistors (FETs) such as MOS-FETSs can also be used but in using such FET devices the circuit speeds and accuracy may be reduced.

The described invention thus teaches a fully differential comparator circuit that compares a differential input to a predetermined threshold voltage that can be adjusted by changing the voltage on of the differential inputs to the circuit. The comparator of the invention further provides a hysteresis that tracks the threshold by a factor that is less than 1.

This completes the description of the preferred embodiment of the invention. Since changes may be made in the above process without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. A computer system comprising:
    receiving means for receiving an input signal waveform;
    identification means coupled to the receiving means for identifying peak characteristics of the waveform;
    output means coupled to the identification means for outputting a plurality of logic signals corresponding to the peak characteristics; and
    logic means coupled to the output means and responsive to the logic signals for detecting a dibit in the waveform.

2. The computer system of claim 1, wherein the logic means includes means for detecting a negative-to-positive dibit and for detecting a positive-to-negative dibit.

3. The computer system of claim 2, wherein the logic means further includes means for detecting a dibit having a valid first peak and a valid second peak.

4. The computer system of claim 2, wherein the logic means further includes means for detecting an individual valid peak.

5. The computer system of claim 3, wherein the identification means includes means for selecting a positive threshold which a positive peak must cross to be characterized as valid and means for selecting a negative threshold which a negative peak must cross to be characterized as valid.

6. The computer system of claim 3, wherein the logic means further includes selection means for causing the detector to output a detection pulse whenever only one of the following are detected: the positive-to-negative dibit, the negative-to-positive dibit, the dibit having a valid first peak and a valid second peak, or an individual valid peak.

7. The computer system of claim 4, wherein the logic means further includes selection means for causing the detector to output a detection pulse whenever only one of the following are detected: the positive-to-negative dibit, the negative-to-positive dibit, or the individual valid peak.

8. An information handling system comprising:
    receiving means for receiving an input signal waveform; and
    characterization means coupled to the receiving means and responsive to the waveform for outputting a plurality of logic signals, the logic signals including:
        a first signal indicating when the waveform's differential amplitude is greater than zero;
        a second signal indicating when the waveform's derivative amplitude is greater than zero;
        a third signal indicating when the waveform's differential signal voltage is greater than a predetermined positive threshold; and
        a fourth signal indicating when the waveform's differential signal voltage is less than a predetermined negative threshold.

9. The system of claim 8, further comprising a logic circuit coupled to the characterization means, the logic circuit including:
    input means for receiving each of the plurality of logic signals; and
    detection means coupled to the input means for outputting a detection pulse when the logic signals indicate that the signal waveform contains a dibit.

10. The system of claim 9, wherein the logic circuit includes control input means for selectively turning off power to the logic circuit.

11. The system of claim 9, wherein the logic circuit includes control input means for selectively turning off power to the characterization means.

12. A method of processing an input waveform comprising the steps of:

(a) receiving the input waveform;

(b) identifying when a differential amplitude of the input waveform is greater than zero volts including outputting an A_POL signal;

(c) identifying when a derivative amplitude of the input waveform is greater than zero volts including outputting a CPOL signal;

(d) identifying when a differential signal voltage of the input waveform is greater than a preset positive threshold selected by a user including outputting a PCOMP signal; and (e) identifying when the differential signal voltage of the waveform is less than a preset negative threshold selected by a user including outputting a NCOMP signal.

13. The method of claim 12, further comprising the step of:

(f) processing one or more of the signals output in the identification steps (b) through (e) including outputting a detection pulse when the processing indicates that a dibit is present in the waveform.

14. The method of claim 12, further comprising the step of:

(g) processing one or more of the signals output in the identification steps (b) through (e) including identifying when (i) an individual valid peak is present in the waveform or (ii) a positive-to-negative dibit is present in the waveform or (iii) a negative-to-positive dibit is present in the waveform; and (h) receiving a control signal and, in response to the control signal, outputting a detection pulse whenever only one of (i) through (iii) is identified as present in the waveform.

* * * * *